United States Patent [19]

Barnes, Jr.

[11] 4,431,269
[45] Feb. 14, 1984

[54] LOW DISTORTION COOLED MIRROR

[75] Inventor: William P. Barnes, Jr., Acton, Mass.

[73] Assignee: Itek Corporation, Lexington, Mass.

[21] Appl. No.: 318,709

[22] Filed: Nov. 6, 1981

[51] Int. Cl.³ .............................................. G02B 5/08
[52] U.S. Cl. ...................................... 350/310; 372/15
[58] Field of Search .................. 350/288, 310; 372/15, 372/99

[56] References Cited

U.S. PATENT DOCUMENTS

| B 520,543 | 1/1976 | Peters et al. ......................... 350/310 |
| 3,609,589 | 9/1971 | Hufnagel ........................ 350/310 X |
| 3,781,094 | 12/1973 | Griest . |
| 3,841,737 | 10/1974 | Rambauske et al. . |
| 3,909,118 | 9/1975 | Schmidt . |
| 3,932,029 | 1/1976 | Weiss . |
| 4,053,241 | 10/1977 | Simmons . |
| 4,099,853 | 7/1978 | Glickler et al. . |
| 4,110,013 | 8/1978 | Eitel ................................ 350/288 X |
| 4,214,818 | 7/1980 | Choyke et al. ................. 350/288 X |
| 4,219,254 | 8/1980 | Macken .......................... 350/288 X |

Primary Examiner—John K. Corbin
Assistant Examiner—Richard F. Gallivan
Attorney, Agent, or Firm—Homer O. Blair; Robert L. Nathans; Gerald H. Glanzman

[57] ABSTRACT

A cooled mirror structure useful in a high power laser optical system, constructed with a substrate formed of a material having a thermal conductivity peak in a cryogenic temperature operating range. During operation, the temperature of the substrate is maintained within the cryogenic temperature operating range to maintain the thermal conductivity within the peak, while the low cryogenic temperature also results in an extremely low coefficient of thermal expansion for the substrate. The combination of high thermal conductivity and a low coefficient of thermal expansion provides a mirror structure capable of handling extremely high energy flux loadings with a minimum amount of resultant surface deformation.

4 Claims, 2 Drawing Figures

LOW DISTORTION COOLED MIRROR

BACKGROUND OF THE INVENTION

1. Field of the Invention

The present invention relates generally to a cooled mirror structure, and more particularly pertains to a cooled mirror structure useful primarily in optical systems having lasers which generate extremely high energy flux levels. In these optical systems a mirror or optical reflector is commonly utilized to reflect an incident laser beam in a desired direction, and despite attempts to construct such mirrors to reflect almost all of the incident laser beam, a small portion thereof is absorbed by the mirror, which can be a substantial total quantity of energy because of the extremely powerful laser beams involved in these systems. The absorbed optical energy is converted to thermal energy which is transferred through the reflector by conduction. The thermally induced temperature increase in the reflector establishes thermal compressive stresses therein which distort the shape or linearity of the reflector front surface, causing errors in the direction of the reflected optical wavefront. Accordingly, it is often necessary to cool the mirror structure to minimize distortions in the reflective surface while accommodating extremely powerful and intense laser beams.

2. Discussion of the Prior Art

The prior art has evolved some highly specialized structures to combine efficient cooling with stable support for the reflecting surface. One approach taken by the prior art to dissipating the thermal energy absorbed by the reflector front surface is to incorporate fins or radiators on the back surface thereof. The fins or radiators serve as heat sinks which dissipate the absorbed thermal energy but do not effectively prevent reflector front surface distortions.

Other prior art cooling arrangements force a fluid or coolant to flow under relatively high pressure against the back surface of the reflector. Examples of some of these prior art cooling arrangements are disclosed in Griest U.S. Pat. No. 3,781,094, Simmons et al. U.S. Pat. No. 4,053,241 and Weiss U.S. Pat. No. 3,932,029.

Rambauske et al. U.S. Pat. No. 3,841,737 is of interest as this patent discloses a mirror structure wherein a metallic base has a relatively low coefficient of thermal expansion, and the base includes cooling passageways through which a liquid refrigerant is passed and evaporated therein in a traditional evaporative cooling process.

Glickler et al. U.S. Pat. No. 4,099,853 is also of interest by disclosing a reflector for a high power laser beam in which a reflector element having a low absorption, transmitting substrate is provided with a rear reflective coating. The reflector element is mounted within a housing using low stress supports to prevent deformation of the reflective element and a resulting loss in optical beam quality in the reflected laser beam. Coolant is sprayed onto the rear surface of the reflector element, preferably in a pattern which modulates the coolant flow volume in accordance with the intensity distribution across the incident laser beam to maintain uniform heating in the reflective element and prevent distortions in the reflected beam.

However, even the aforementioned highly specialized cooled mirror structures are not capable of handling presently available laser energy flux levels, particularly continuous wave operations for one second and greater time durations, while maintaining surface distortions within acceptably low limits.

In general, the aforementioned prior art approaches have concentrated on cooled mirrors having metal substrates which are designed to operate at or near room ambient temperature. The thermal distortions induced in the mirrors are determined by the characteristics of the substrate material at the ambient temperature, namely the ratio of its coefficient of thermal expansion $\alpha$ to its thermal conductivity k. For some metals and ultra-low expansion materials such as ULE ® (ULE is a trademark of Corning Glass Works for their code 7971 titanium silicate glass) and CER-VIT, the $\alpha/k$ values are of the order of $10^{-8}$ meters per watt. However, these materials still yield intolerably high thermal distortions in laser systems having actively cooled mirror elements.

SUMMARY OF THE INVENTION

Accordingly, it is a primary object of the present invention to provide a cooled mirror structure capable of handling energy flux loadings several orders of magnitude greater than prior art constructions while maintaining comparable surface distortions.

A further object of the subject invention is the provision of a cooled mirror structure having significantly higher heat transfer capabilities than are available in the prior art while maintaining surface distortions within acceptably low limits.

The present invention proceeds from the recognition that all known materials which are possible candidates for cooled mirrors substrates do not offer a sufficiently low $\alpha/k$ ratio at ambient room temperatures, and that the aforementioned ratio of several materials becomes significantly lower at cryogenic operating temperatures.

In accordance with the teachings of the present invention, a cooled mirror is constructed with a substrate formed of a material having a thermal conductivity peak in a cryogenic temperature operating range, and during operation the temperature of the substrate is maintained within that cryogenic temperature operating range to maintain its thermal conductivity within the peak, while the low cryogenic temperature also results in an extremely low coefficient of thermal expansion for the substrate. The combination of high thermal conductivity and a low coefficient of thermal expansion provides a mirror structure capable of handling extremely high energy flux loadings with a minimum amount of resultant surface deformation.

In greater detail, the present invention provides a cooled mirror assembly in which a mirror substrate supports a reflective surface, and the substrate is formed of a material having a low ratio, below $10^{-10}$, of its coefficient of thermal expansion $\alpha$ to its thermal conductivity k in its cryogenic temperature operating range of generally between ten and one hundred degrees Kelvin. A cryogenic cooling system is provided to maintain the cooled mirror assembly in its cryogenic temperature operating range, and may comprise, for example, a liquid neon evaporative cooling system.

The selection of the substrate material is critical to the present invention, and it may be one of several materials, such as some crystalline materials which exhibit a thermal conductivity peak in a cryogenic temperature range. More particularly, copper, diamond, sapphire, silicon and silicon carbide are suitable substrate materials, with sapphire appearing to have the most favorable thermal conductivity and coefficient of thermal expansion characteristics in a cryogenic temperature operating range. The cryogenic cooling system for the mirror is selected to match the thermal conductivity peak of the substrate material, and for a sapphire substrate a liquid neon evaporative cooling system appears to be particularly suitable.

BRIEF DESCRIPTION OF THE DRAWING

The foregoing objects and advantages of the present invention for a low distortion cooled mirror may be more readily understood by one skilled in the art with reference being had to the following detailed description of several preferred embodiments thereof, taken in conjunction with the accompanying drawings wherein.

DETAILED DESCRIPTION OF THE DRAWING

Figure 1:
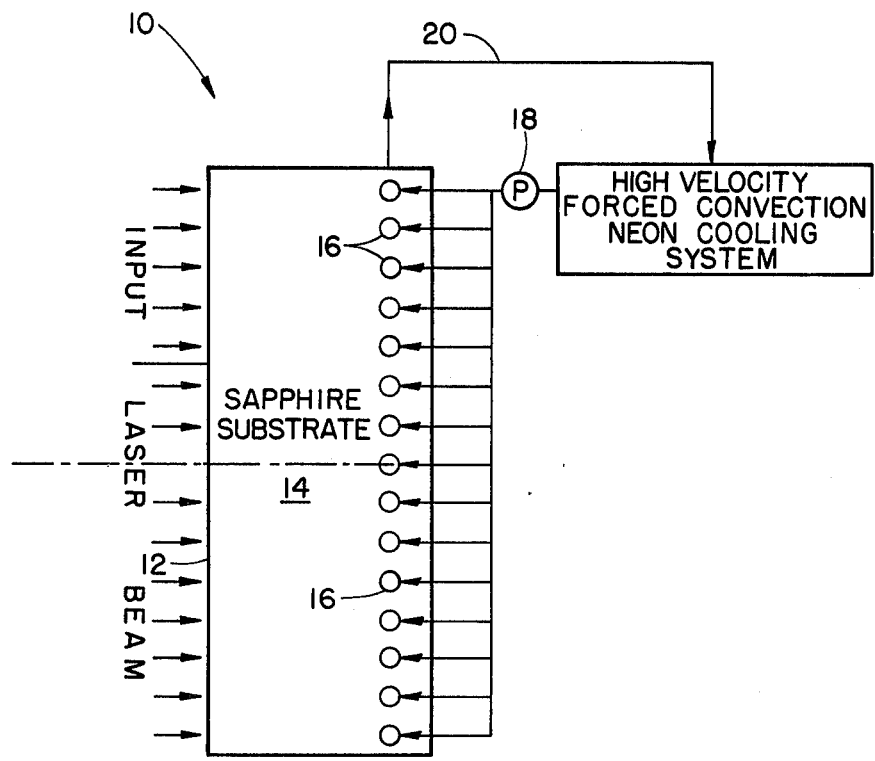
FIG. 1 illustrates schematically one preferred embodiment of a cooled mirror constructed pursuant to the teachings of the present invention.

In the design of a low distortion cooled mirror pursuant to the teachings herein, the following discussion of high energy flux problems is indicative of the more important design considerations. In general, the heat absorbed by the reflective surface and its substrate should be removed as rapidly as it is absorbed and delivered to an associated heat sink for disposal. The operating temperatures of both the mirror materials and the associated cooling fluids must be maintained in ranges compatible with material survivability and assumed behavior such as thermal expansion, thermal conductivity, viscosity and specific heat. Finally, the temperature gradients must be controlled to levels compatible with acceptable surface distortions.

The relationship between the temperature gradient, dT/dx, the heat flux per unit area, q, and thermal conductivity k is given by the formula, $$q = k \frac{dT}{dx} \quad (1)$$

For the best thermal conductors at room temperature (Cu, Ag, Au), the temperature gradients at the high energy flux loadings contemplated herein are quite large. Thermal strain differences would be of the order of $10^{-3}$, and thermal stresses could easily reach 10,000 lb/in$^2$. The deflection of an unconstrained substrate several centimeters (3 cm.) in diameter at these high flux loads would be several hundred microns. An initial conclusion is that successful operation of such cooled mirrors at or near room temperatures (or above) is not possible at relatively high energy flux loadings.

However, the present invention proceeds from the realization that several materials such as crystalline materials, including both metals and dielectrics, display peaks in thermal conductivity at cryogenic temperatures. As the temperature is lowered, the population of phonons with sufficient energy to participate in establishing thermal equilibrium by a two-phonon umklapp collision (which does not conserve momentum) is reduced, and the resistance to momentum (heat) transfer declines markedly. If two phonon collisions were the only mechanism involved, the thermal conductivity k would approach infinity as the temperature approaches absolute zero. However, thermal conductivity is also limited by single phonon mean free path considerations, for which kinetic theory yields:

$$k = \frac{C v l}{3} \quad (2)$$

where C is the heat capacity, v the average phonon velocity and l the phonon mean free path. At low temperatures, k is limited by a $T^3$ dependence on C and the fact that l approaches the dimensions of the crystal.

The peak values of thermal conductivity attained are thus strong functions of the physical state of the material such as impurities, inclusions and dislocations, and small crystal sizes, all of which contribute to reducing the thermal conductivity k. Accordingly, the peak values of thermal conductivity are very adversely affected by chemical impurities and physical defects in the substrate material. However, for a cooled mirror having a diameter of several centimeters, a limitation to high purity materials is not too severe.

High thermal conductivity (k) values are available in several potential substrate materials only over a limited cryogenic temperature range. The peaks in thermal conductivity are relatively sharp over a limited temperature range, which allows only limited temperature excursions of typically ten to twenty degrees during operation of a cryogenically cooled mirror pursuant to the teachings of the present invention.

Most materials exhibit decreasing values for their coefficients of thermal expansion $\alpha$ as the temperature is reduced. For some, negative values are attained before the final convergence of all to $\alpha \equiv 0$ at $T = 0$. Negative values are a common feature of materials with tetrahedral coordination, such as fused silica, silicon and germanium. At moderate temperature gradients, unconstrained deflections of a cooled mirror substrate several centimeters in diameter will be below 50 nm if $\alpha$ is less than $2(10^{-8})K^{-1}$.

Values of the coefficients $\alpha$ for several potential substrate materials at temperatures at which their thermal conductivity k is a maximum are shown by the following Table I. Moreover, as explained above, the thermal distortions induced in a high flux mirror are determined by the ratio of its coefficient of thermal expansion $\alpha$ (which ideally should be maintained as low as possible) to its thermal conductivity k (which ideally should be maintained as high as possible). Table I also indicates this ratio for the listed materials.

| | THERMAL DISTORTION PARAMETERS OF SELECTED MATERIALS* | | | |
|---|---|---|---|---|
| MATERIAL | TEMPERATURE** K | THERMAL CONDUCTIVITY, k W/m-K | THERMAL EXPANSION COEFFICIENT $\alpha$ $K^{-1}$ | $\alpha/k$ m/W |
| Cu | 10 | 20,000 | $3(10^{-8})+$ | $1.5(10^{-12})$ |
| C (Diamond) | 70 | 12,000 | $-8(10^{-8})$ | $6.7(10^{-12})$ |
| Al$_2$O$_3$ (Sapphire) | 30 | 20,700 | $<10^{-7}++$ | $<10^{-11}$ |

-continued

| | | | THERMAL | |
| | | THERMAL | EXPANSION | |
| | TEMPERATURE** | CONDUCTIVITY, k | COEFFICIENT α | α/k |
| MATERIAL | K | W/m-K | $K^{-1}$ | m/W |

THERMAL DISTORTION PARAMETERS OF SELECTED MATERIALS*

| Si | 25 | 5,140 | $-2(10^{-8})$+ | $4(10^{-12})$ |
| SiC | 55 | 5,250 | $7(10^{-8})$ | $1.3(10^{-11})$ |

*Values recommended in publications of TEPIAC/CINDAS (Purdue University) used where available.
**Temperature at which thermal conductivity, k, is a maximum for the most pure form of the material
+G. K. White, AIP Conf. Proc. No. 17, (1973).
++No data below 88K in TPRC, Vol. #13 (1977). Extrapolation indicates probable value shown.

The data of Table I indicates that several mirror substrate materials are available for operation in a cryogenic temperature range of between ten and one hundred degrees Kelvin which have a low ratio, below $10^{-10}$ (which is several orders of magnitude below the prior art), of α/k. It may be recognized that new data on other oxides, carbides, borides and nitrides may reveal additional candidate substrate materials.

The following discussion is indicative of the more important design considerations of a cryogenic cooling system for a cryogenically operated high flux mirror. An analysis has indicated that a physically limiting factor for a cryogenically cooled high flux substrate is the capability to transfer energy to a liquid coolant sufficiently rapidly such that the substrate does not rise to temperatures above those of the aforementioned high conductivity peak. In addition, bulk temperatures of the liquid and local liquid temperatures near the solid/liquid boundary should be limited to moderate variations.

A review of heat transfer mechanisms, such as phase changes upon melting or evaporation, endothermic chemical reactions, solute/solvent reactions and thermoelectric effects has also indicated that the most effective method of transferring heat from a solid substrate is by high velocity forced convection to a liquid.

Since operation of the cooled mirror substrate is to be below 100° K., the selection of potential coolant materials which are liquid (or gaseous) is limited. A limited search for available coolants has uncovered only the materials of the following Table II as satisfactory coolant candidates.

TABLE II

FLUID MATERIALS FOR T < 100° K.
(ignoring isotopic differences)

| Material | Melting Point °K. | Boiling Point °K. | Critical Temperature, °K. |
|---|---|---|---|
| He | 1.8 | 4.2 | 5.2 |
| $H_2$ | 13.9 | 20.4 | 33.2 |
| Ne | 24.5 | 27.2 | 44.4 |
| $N_2$ | 63.1 | 77 | 126.3 |

A comparison of the data in Tables I and II indicates that the melting point to critical temperature range of neon is a very good match with respect to the high conductivity temperature range of sapphire.

Figure 2:
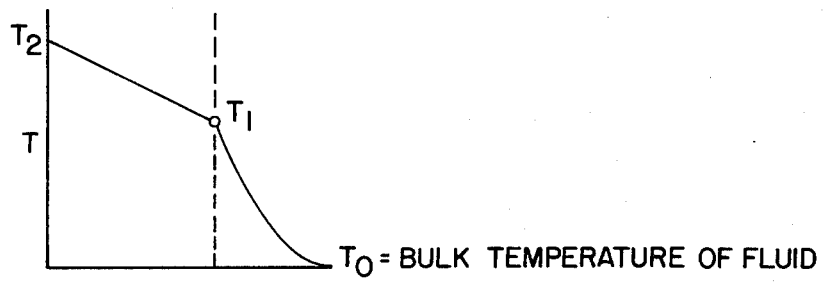
FIG. 2 is a graph illustrating the temperature variation across the mirror substrate of FIG. 1.

The following relations are useful for a first order analysis of the cryogenic cooling system. First, the total temperature drop across the solid/liquid interface (as shown in FIG. 2) is given by:

$$(T_1 - T_o) = q/h$$

where h is the surface coefficient of heat transfer. This coefficient is correlated with fluid properties, velocity and channel diameter, for a broad range of liquids and gases, by the following relation for a high velocity forced convection cooling system:

$$\frac{hD}{k} = 0.023 \left(\frac{DV\rho}{\mu}\right) 0.8 \left(\frac{C_p \mu}{k}\right) 0.4$$

Where D is the diameter of the fluid channel, V is the fluid velocity, and $\rho$, $C_P$, $\mu$ and k are respectively the density, specific heat, viscosity and thermal conductivity of the fluid.

The parameters of an exemplary cryogenic cooling system are illustrated in FIGS. 1 and 2. FIG. 1 illustrates a high flux cooled mirror 10 constructed with a mirrored reflecting surface 12 on a sapphire substrate 14. A plurality of parallel coolant channels 16 are provided, extending as secants across the width of the substrate near the rear surface thereof. A high velocity forced convection neon cooling system, having a high pressure pump 18, pumps the liquid neon, having an initial temperature of 27° K., with a high velocity flow through the coolant channels 16 to absorb the heat absorbed by the substrate from the incident laser beam. In alternative embodiments, the channels 16 may be arranged radially relative to the circular substrate or in any other effective cooling flow configuration. The extremely high heat conductivity of the cryogenically cooled sapphire substrate would allow many different types of cooling channel configurations to be utilized in the present invention. The liquid neon, after absorbing the heat from the substrate, can be returned via channels 20, shown schematically as one channel, to the source of refrigerated liquid neon where it is again cooled to be recirculated in a closed loop system, or alternatively in some embodiments the heated liquid neon can be simply dumped from the cooling system in a non-closed loop design.

FIG. 2 illustrates the anticipated temperature gradient across the substrate between the reflective surface 12 and the plane of the cooling channels 16.

While several preferred embodiments of the present invention have been described in detail herein, it should be realized that many other variations and modifications should be available to one skilled in the art within the teachings of the present invention. For instance, a number of materials exhibit very high thermal conductivity at low temperatures and could also be potential substrate materials, such as aluminum and iron among the metals, and silicon carbide, beryllia, and diamond among the nonmetals and also isotopic variations of the materials. These materials all exhibit thermal conductivity peaks greater than 30 W/cm. Significantly, these materials exhibit conductivity peaks at various temperatures in the range of 4° K. (aluminum) to 100° K. (silicon carbide). Within this group, the nonmetals appear to be more attractive as in general they have smaller thermal expansion coefficients. Other carbides, borides and nitrides may also be potential substrate materials.

What is claimed is:

1. A cooled mirror assembly comprising:
   a. a mirror substrate supporting a reflective surface, said substrate being formed of a material having a minimum ratio, below $10^{-10}$, of its coefficient of thermal expansion $\alpha$ to its thermal conductivity k, within the cryogenic range of temperature from ten to one hundred degrees Kelvin; and
   b. means for cryogenically cooling said substrate to less than one hundred degrees Kelvin such that said substrate operates at or near said minimum of $\alpha/k$.

2. A cooled mirror assembly as claimed in claim 1, said means for cryogenically cooling including a high velocity forced convection liquid cooling system.

3. A cooled mirror assembly as claimed in claim 1 or 2, said substrate material being of the group comprising copper, diamond, sapphire, silicon and silicon carbide.

4. A cooled mirror assembly as claimed in claim 1 or 2, said substrate material being a crystalline material having a thermal conductivity peak in said cryogenic range of temperature.

* * * * *